United States Patent [19]
Mabuchi

[11] Patent Number: 4,521,710
[45] Date of Patent: Jun. 4, 1985

[54] COMMUTATOR DEVICE FOR MINIATURE MOTORS

[75] Inventor: Takaichi Mabuchi, Matsudo, Japan
[73] Assignee: Mabuchi Motor Co. Ltd., Japan

[21] Appl. No.: 566,717
[22] Filed: Dec. 29, 1983
[30] Foreign Application Priority Data
Dec. 29, 1982 [JP] Japan .......................... 57-197780[U]
[51] Int. Cl.[3] .......................................... H02K 13/04
[52] U.S. Cl. ...................................... 310/234; 310/42; 29/597; 29/863
[58] Field of Search ................................ 310/233-237, 310/40 MM, 42, 219, 232; 29/597, 863

[56] References Cited

U.S. PATENT DOCUMENTS

| | | | |
|---|---|---|---|
| Re. 27,893 | 1/1974 | Miller | 310/234 |
| 3,061,747 | 10/1962 | Hohler | 310/234 |
| 3,781,981 | 1/1974 | Miura | 310/234 |
| 3,914,632 | 10/1975 | Nylen | 310/235 |
| 4,326,140 | 4/1982 | Rohloff | 310/234 |
| 4,342,933 | 8/1982 | Gerlach | 310/234 |

FOREIGN PATENT DOCUMENTS

| | | | |
|---|---|---|---|
| 0656340 | 9/1963 | Italy | 310/235 |

*Primary Examiner*—R. Skudy
*Attorney, Agent, or Firm*—McGlew & Tuttle

[57] ABSTRACT

A commutator device for miniature motors comprising commutator segments, each segment having an arc-shaped commutator part and a terminal part standing upright from the commutator part; the commutator part being mounted on an insulating cylinder and the terminal part being bent to hold a lead wire connected to an armature winding wherein the terminal part of the commutator segment has a neck portion at which the transverse crosssectional area of the terminal part is made smaller than the transverse crossectional area of other portions therof, and an arrangement for easily bonding the lead wire to the neck portion is provided so that the lead wire is held in position by bending the terminal part at the neck portion thereof, and welded to the terminal part with resistance welding.

6 Claims, 11 Drawing Figures

PRIOR ART FIG. 1
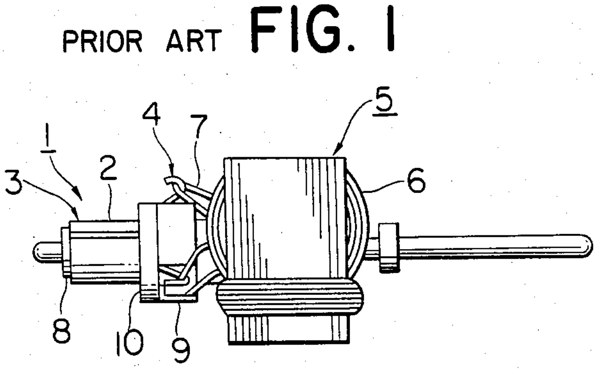
PRIOR ART FIG. 2
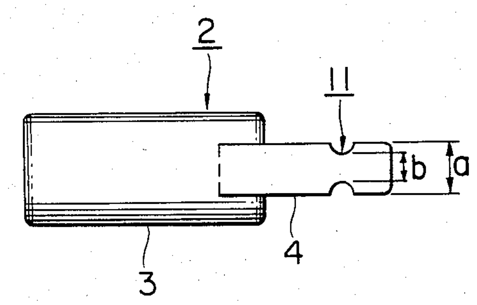
PRIOR ART FIG. 3
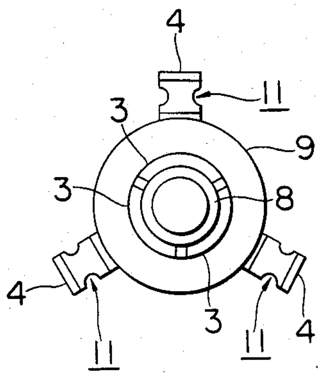
PRIOR ART FIG. 4
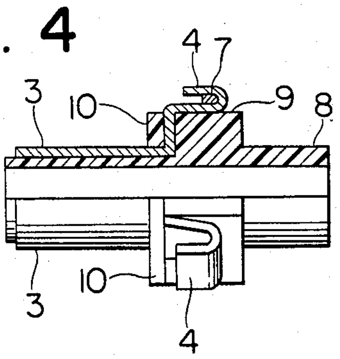

COMMUTATOR DEVICE FOR MINIATURE MOTORS

BACKGROUND OF THE INVENTION

This invention relates generally to a commutator device for miniature motors, and more particularly to a commutator device for miniature motors in which a terminal part of a commutator segment has a neck portion at which the transverse crosssectional area of the terminal part is made smaller than the transverse crossectional area of other portions thereof, and a means for easily bonding a lead wire to the terminal part is provided so that a lead wire is held in position by bending the terminal part at the neck portion thereof, and welded to the terminal part with resistance welding.

DESCRIPTION OF THE PRIOR ART

The present applicant proposed earlier a means for overcoming drawbacks in adopting the conventional resistance welding method, called the fusing method, to connect armature windings and commutator segments in a miniature motor. The earlier proposal was concerned with a commutator device for miniature motors where the width or thickness of the portion of a terminal part at which a lead wire is pressure welded is locally made smaller to increase the electrical resistance thereof so as not only to make the bending of the terminal part easy but also to make it possible to obtain desired heat with a small current value while reducing the heating range to a small area, whereby preventing poor continuity between the terminal part and the lead wire and the deformation of the insulating cylinder due to heat.

In the following, the commutator device for miniature motors proposed earlier by the present applicant will be described.

FIG. 1 shows the relationship between the commutator device and the armature in a miniature motor.

FIG. 2 is a development of assistance in explaining an example of a commutator segment used in the commutator device of the present applicant's earlier proposal.

FIG. 3 is a front view of an example of the commutator device of the earlier proposal.

FIG. 4 is a sectional side elevation of the commutator device of the earlier proposal of assistance in explaining the state where the lead wire is connected to the terminal part with the fusing method.

In the figures, reference numeral 1 refers to a commutator device; 2 to a commutator segment; 3 to a commutator part; 4 to a terminal part; 5 to an armature; 6 to an armature winding; 7 to a lead wire; 8 to an insulating cylinder; 9 to an insulating flange; 10 to an insulating washer; 11 to a neck portion, respectively.

The commutator segment 2 used in the commutator device of the earlier proposal, a development of which is shown in FIG. 2, has the neck portion 11 formed by making the width, shown by a in the figure, of the terminal part 4 is made slightly smaller. That is, the width, b of the neck portion 11 is smaller than the width a of the terminal part 4. Though not shown in the figure, the terminal part 4 is bent at a portion shown by a dotted line at right angles with respect to the commutator part 3. Furthermore, the terminal part 4 is bent in a U-shape at the neck portion 11. In this case, the commutator part 3 is of course bent in an arc shape along the surface of the insulating cylinder 8. As shown in FIGS. 3 and 4, the commutator device 1 is constructed in such a fashion that the commutator segment 2 shown in FIG. 2 is disposed on the insulating cylinder 8 and fixedly fitted thereto by setting the insulating washer 10 onto the terminal part 3, and the lead wire 7 and the terminal part 4 are bonded together, as shown in FIG. 4, by placing the lead wire 7 in the U-shaped neck portion 11 of the terminal part 4 and forcing an electrode (not shown) onto the terminal part 4 and causing electric current to flow between the electrode and another electrode provided on the commutator part 3 in a smaller amount than the amount required with the terminal part not having said neck portion 11.

With the construction of the commutator device described in reference to FIGS. 2 and 3, however, poor electrical contact may often be caused, resulting in unwanted fluctuations in the revolution of the motor. Furthermore, the force that holds the lead wire in the U-shaped neck portion is relatively weak. When an external force is exerted in such a direction as to open the terminal part 4 during the assembly, transport and handling of the rotor and the assembly of the motor, the force that holds the terminal tends to become even weaker, leading to poor electrical contact. In addition, the insulating cylinder in the commutator to which the fusing method is applied is generally made of a thermosetting resin, which is usually expensive and cannot be manufactured efficiently in a volume production line. It is desired therefore that the insulating cylinder be made of a thermoplastic resin, which is inexpensive and superior in volume production efficiency.

SUMMARY OF THE INVENTION

This invention is intended to overcome the aforementioned problems associated with the fusing method.

It is the first object of this invention to make it possible to weld the terminal part and the lead wire with resistance welding even at low temperatures and pushing forces by providing a neck portion of the portion of the terminal part where the lead wire is pressure welded so as to easily bend the terminal part at the neck portion and to permit the lead wire to be inserted in the bent neck portion, and providing a means for easily bonding the lead wire on the neck portion, whereby preventing poor continuity between the terminal part and the lead wire and the deformation of the insulating cylinder made of a thermoplastic resin and increasing the bond strength between the lead wire and the terminal part.

It is the second object of this invention to make it possible to weld the lead wire and the terminal part with the fusing method even at relatively low temperatures and pushing forces by providing a multiplicity of ridges or knobs as a means for easily bonding the lead wire to ensure a firm grip of the lead wire in the terminal part, whereby enabling the use of an inexpensive thermoplastic resin for the insulating cylinder.

It is the third object of this invention to make it possible to weld the lead wire and the terminal part with the fusing method even at relatively low temperatures and pushing force by coating the neck portion of the terminal part with a low-melting metal layer as a means for easily bonding the lead wire, whereby enabling the use of an inexpensive thermoplastic resin for the insulating cylinder.

These and other objects will become more apparent upon a reading of the following detailed description taken in connection with the accompanying drawings.

BRIEF DESCRIPTION OF THE DRAWINGS

FIGS. 1 through 4 are diagrams of assistance in explaining the conventional type of commutator device for miniature motors.

DETAILED DESCRIPTION OF THE EMBODIMENT

Figure 5:
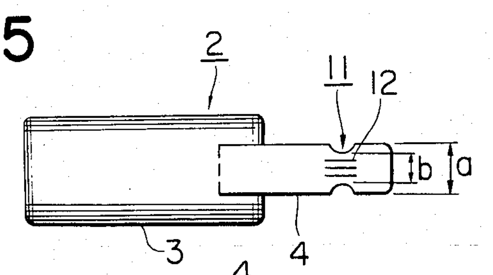
FIG. 5 is a development of a commutator segment used in the first embodiment of this invention.

In FIGS. 5 through 11, the same reference numbers as those in FIG. 1 through 4 correspond with like parts throughout. Reference numeral 12 refers to linear ridges arranged in the longitudinal direction of the terminal surface; 13 to linear ridges arranged obliquely on the terminal surface; 14 to knobs on the terminal surface; 15 to a low-melting metal layer, such as tin or solder, deposited on the terminal surface, respectively.

Figure 6:
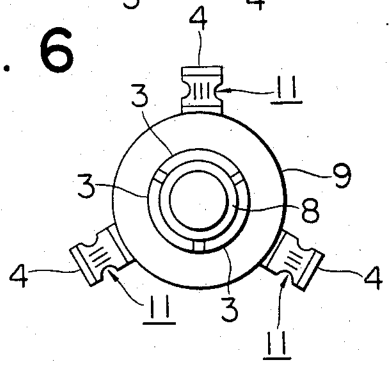
FIG. 6 is a front view of the first embodiment of this invention.
Figure 7:
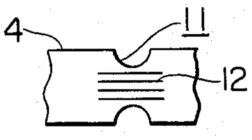
FIG. 7 is an enlarged view of the essential part of the first embodiment shown in FIG. 5.
Figure 8:
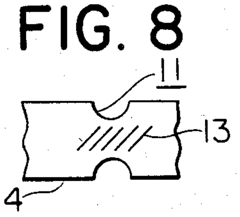
FIG. 8 is an enlarged view of the essential part of the second embodiment of this invention.
Figure 9:
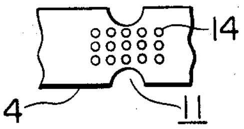
FIG. 9 is an enlarged view of the essential part of the third embodiment of this invention.
Figure 10:
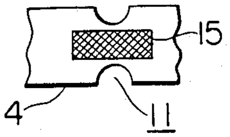
FIG. 10 is an enlarged view of the essential part of the fourth embodiment of this invention.
Figure 11:
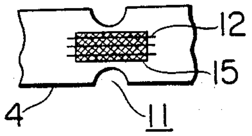
FIG. 11 is an enlarged view of the essential part of the fifth embodiment of this invention.

In this invention, the neck portion 11 is provided on the terminal part 4 of the commutator segment 2 of the commutator device for miniature motors of this invention, and a means for easily bonding the lead wire 7 is provided on the terminal surface, as shown in FIGS. 5 through 11. The means for easily bonding the lead wire 7 as shown in FIGS. 5 through 7 is linear ridges 12 arranged in the longitudinal direction of the terminal surface, that shown in FIG. 8 is linear ridges 13 arranged obliquely on the terminal surface, that shown in FIG. 9 is knobs 14 on the terminal surface, that shown in FIG. 10 is a low-melting metal layer deposited on the terminal surface, and that shown in FIG. 11 is a combination of the ridges 12 as shown in FIG. 7 and the low-melting metal layer 15 as shown in FIG. 10. In place of the ridges 12 in the embodiment shown in FIG. 11, the ridges 13 as shown in FIG. 8 or the knobs 14 as shown in FIG. 9 may be provided on the terminal surface.

In the embodiments shown in FIGS. 7, 8, 9 and 11, the ridges 12 or 13, or the knobs 14 firmly grip the lead wire 7, ensuring the bonding of the lead wire 7 and the terminal part 4 even at lower temperatures during the fusing process as described, referring to FIG. 4.

Now, temperature conditions in the fusing process will be discussed, taking into consideration the embodiments shown in FIGS. 10 and 11.

When a copper wire is welded with the fusing process, spot welding heat must be more than 1000° C. to ensure perfect fusing of the copper wire to the terminal since the melting point of copper is 1084° C.

In this invention, on the other hand, the following temperatures will serve the purpose. That is, the film breakdown temperature of a resin normally used as the insulating materials of the lead wire 7 of the rotor is:

| | |
|---|---|
| Polyurethane resin film | 120° C. |

-continued

| | |
|---|---|
| Polyester resin film | 130° C. |

Consequently, the insulating film of the lead wire can be destructed completely at approx. 150° C. On the contrary, the melting point of a low-melting metal layer deposited on the terminal surface is:

| | |
|---|---|
| Tin film | 232° C. |
| Solder film | 180° C. (in the case of solder of the lowest melting point) |

Thus, the tin coating film deposited on the terminal surface according to this invention can be fused with the lead wire at 250° C. while the solder coating film at 200° C. In this invention, therefore, the fusing process can be applied to the commutator device using a thermoplastic resin for the insulating cylinder thereof because the lead wire and the terminal part can be fused together at lower temperatures.

As described in detail in the foregoing, this invention makes it possible to easily bend the terminal part by providing a neck portion on the terminal part, and to increase the bonding strength of the lead wire and the terminal part by providing a means for easily bonding the lead wire to ensure a firm grip or a fusing of the lead wire and the terminal part at lower temperatures using a low-melting metal. As a result, poor electrical contact due to the centrifugal force of the rotor can be prevented and accordingly fluctuations in the revolution of the motor can also be prevented.

The increased bonding strength helps prevent poor electrical contact due to an unexpected accident during the assembly, transport and handling of the rotor and the assembly of the motor.

Furthermore, thermoplastic resins, which are less expensive than thermosetting resins, can be used for the insulating cylinder because the fusing process can be effected at low temperatures and pushing forces.

What is claimed is:

1. A commutator device for miniature motors comprising commutator segments having arc-shaped commutator parts and terminal parts standing upright from said commutator parts; said commutator segments being mounted on an insulating cylinder and said terminal parts being bent to hold lead wires of armature windings, said terminal parts having another portion and a neck portion having a smaller transverse cross-sectional area than the transverse cross-sectional area of said another portion of said terminal part, and means for easily bonding said lead wire is provided on said neck portion to permit said terminal part to be bent at said neck portion to hold said lead wire and to allow said terminal part and said lead wire to be fused together with resistance welding, comprising linear ridges extending in the longitudinal direction of said terminal part.

2. A commutator device for miniature motors as set forth in claim 1 wherein said linear ridges are provided obliquely in the longitudinal direction of said terminal part as said means for easily bonding said lead wire at said neck portion.

3. A commutator device for miniature motors as set forth in claim 1 wherein said linear ridges are arranged in the longitudinal direction of said terminal part, in combination with a low-melting layer deposited on said terminal part, as said means for easily bonding said lead wire at said terminal part.

4. A commutator device for miniature motors as set forth in clam 2 wherein said linear ridges are arranged obliquely in the longitudinal direction of said terminal part, in combination with a low-melting metal layer deposited on said terminal part, as said means for easily bonding said lead wire at said terminal part.

5. A commutator device for miniature motors comprising commutator segments having arc-shaped commutator parts and terminal parts standing upright from said commutator parts; said commutator segments being mounted on an insulating cylinder and said terminal parts being bent to hold lead wires of armature windings, said terminal parts having another portion and a neck portion having a smaller transverse cross-sectional area than the transverse cross-sectional area of said another portion of said terminal part, and means for easily bonding said lead wire is provided on said neck portion to permit said terminal part to be bent at said neck portion to hold said lead wire and to allow said terminal part and said lead wire to be fused together with resistance welding, said means comprising a multiplicity of knobs being provided on said terminal part as said means for easily bonding said lead wire at said neck portion.

6. A commutator device for miniature motors comprising commutator segments having arc-shaped commutator parts and terminal parts standing upright from said commutator parts; said commutator segments being mounted on an insulating cylinder and said terminal parts being bent to hold lead wires of armature windings, said terminal parts having another portion and a neck portion having a smaller transverse cross-sectional area than the transverse cross-sectional area of said another portion of said terminal part, and means for easily bonding said lead wire is provided on said neck portion to permit said terminal part to be bent at said neck portion to hold said lead wire and to allow said terminal part and said lead wire to be fused together with resistance welding, said means including a multiplicity of knobs being provided on said terminal part, in combination with a low-melting metal layer deposited on said terminal part, as said means for easily bonding said lead wire at said terminal part.

* * * * *